March 18, 1958 C. L. CALLUM 2,827,155
BALE-HANDLING APPARATUS
Filed Jan. 29, 1957 2 Sheets-Sheet 1
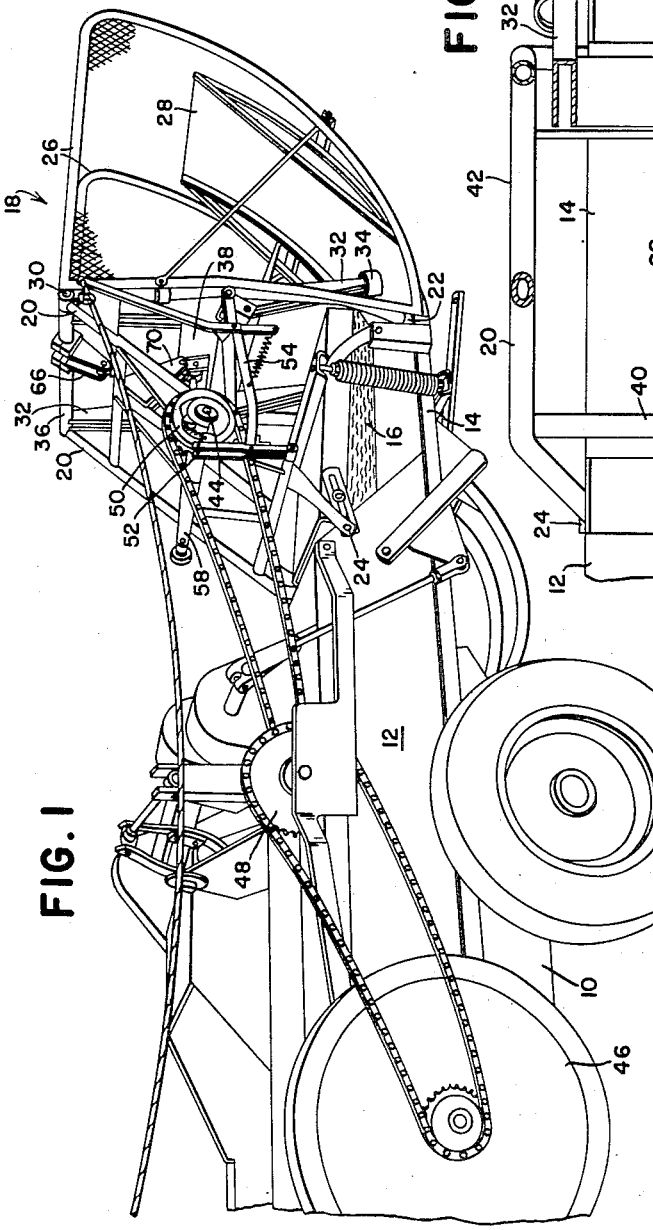
INVENTOR.
C. L. CALLUM March 18, 1958 — C. L. CALLUM — 2,827,155
BALE-HANDLING APPARATUS
Filed Jan. 29, 1957 — 2 Sheets-Sheet 2
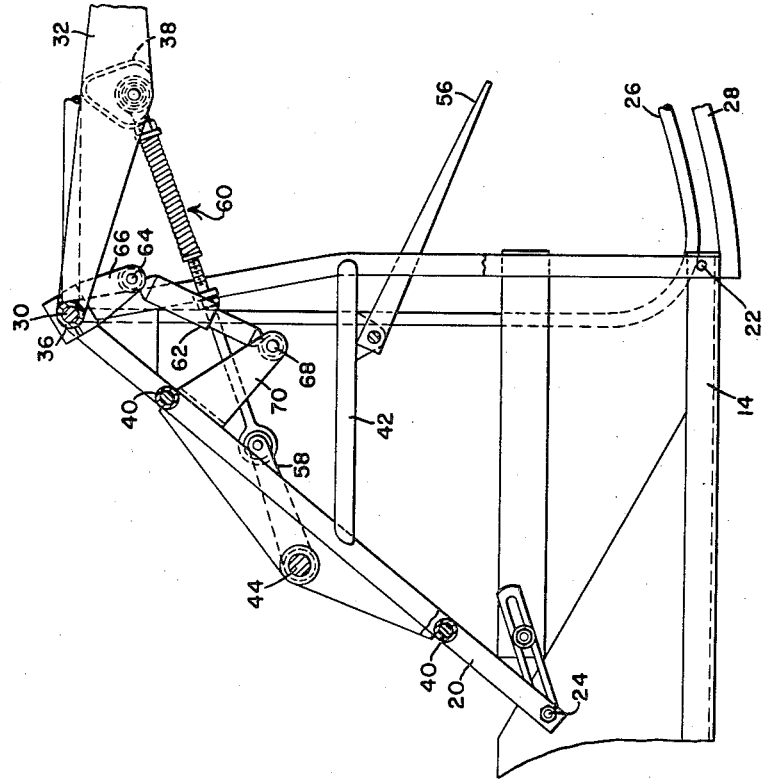
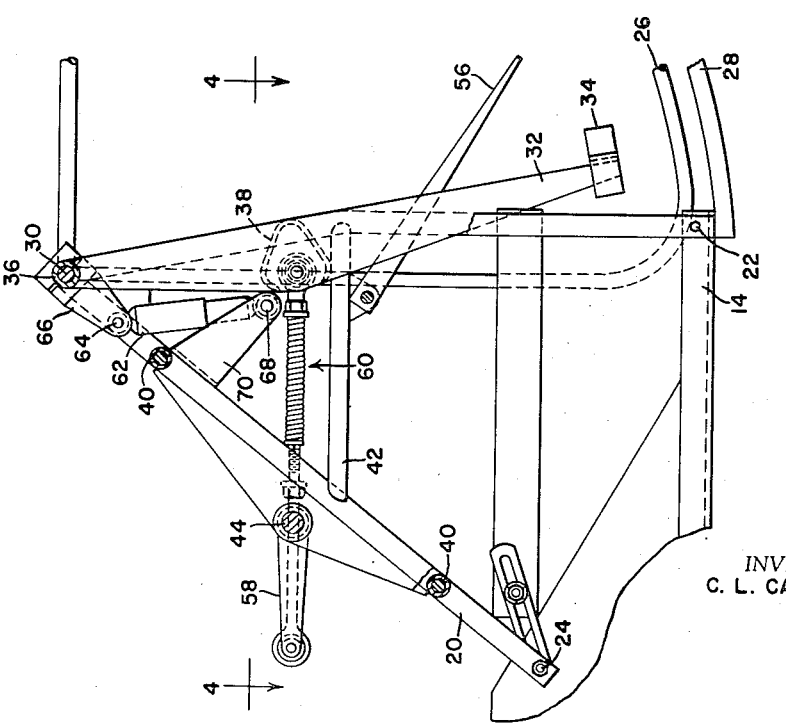
INVENTOR.
C. L. CALLUM

United States Patent Office 2,827,155
Patented Mar. 18, 1958

2,827,155

BALE-HANDLING APPARATUS

Charles L. Callum, Ottumwa, Iowa, assignor to Deere Manufacturing Co., Dubuque, Iowa, a corporation of Iowa Application January 29, 1957, Serial No. 636,986

9 Claims. (Cl. 198—128)

This invention relates to a machine for handling bales or like articles and relates more particularly to an improvement in the apparatus or machine that forms the subject matter of the U. S. patent to Morrison et al. 2,756,865.

As disclosed in that patent, the apparatus is mounted on the rear end of a conventional agricultural pick-up baler and operates to receive discharged bales as they are ejected by the machine and to project the bales successively to a trailing vehicle. The system distinguishes from the conventional practice in which bales are discharged to the ground and subsequently picked up and loaded on a suitable wagon. The principle of operation of the apparatus is that the means for receiving and trajecting the bale operates on a delivery stroke from a starting position to a delivery position and on this stroke the means successively accelerates and decelerates, whereby the bale is released and by its own momentum carries beyond the delivery position.

The principal object of the present invention is to utilize means in such apparatus for eliminating or at least absorbing some of the peak loads involved, particularly those at the end of the delivery stroke. It has heretofore been proposed to snub or otherwise retard the mechanism at the end of the delivery stroke, and also at the end of the return stroke, primarily by the use of a shock absorber of the fluid-flow-restrictive type, such as in assignee's copending application by Forth et al., Serial No. 561,455, filed January 26, 1956. According to the present invention, the prior structures are improved by the utilization of a yielding pitman which enables the bale-throwing means to have a limited amount of overrun relative to the power means, thereby giving the shock-absorber a greater opportunity to function. It is a further object of the invention to embody the improved drive connection in structures of existing types.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

Fig. 1 is a fragmentary perspective of a typical pick-up baler having a bale-handling apparatus mounted thereon.

Fig. 2 is an enlarged elevation, partly in section, showing the bale-moving element in its starting position.

Fig. 3 is a similar view showing the element in its delivery position.

Fig. 4 is a plan, partly in section as seen along the line 4—4 of Fig. 2.

Fig. 5 is a fragmentary section on an enlarged scale showing part of the pitman connection.

That portion of the baler shown in Fig. 1 will be recognized as a commercially popular mobile pick-up type having a main frame 10 including a bale case 12 and a bale case extension 14. By conventional means, not material here, bales are successively formed and tied in the bale case 12 and are ejected onto the bale case extension 14, a typical ejected bale being shown at 16. In prior practice it was customary to eject the bale, as at 16, directly to the ground, which would occur as a succeeding bale forced the bale through the open rear end of the bale case extension. However, according to the Morrison patent, the ejected bale, as at 16, is handled by the bale-handling apparatus, indicated here in its entirety at 18. This apparatus comprises suitable supporting structure in the form of a pair of laterally spaced apart side frames or supports 20, which are rigidly mounted on the baler as at 22 and 24. Safety screens or panels 26 flank the bale case extension and project rearwardly therefrom and between these panels is an upwardly and rearwardly inclined bale-guiding chute 28 which is arcuate about a transverse pivot 30 that interconnects the supports or frames 20 at their tops.

This pivot carries a bale throwing element which is made up of a pair of similar depending arms 32, which depend to lower ends having bale-engaging means 34 thereon. As will be readily apparent from Fig. 4, the ejected bale moves between the bale-engaging means 34 and as the arms 32 swing from the starting position of Fig. 2 to the delivery position of Fig. 3 the bale is caused to move rearwardly and upwardly substantially in an arc about the pivot 30. As will be brought out below in greater detail, the bale-moving element is successively accelerative and decelerative on its delivery stroke and when it reaches the end of that stroke, as determined by the delivery position (Fig. 3), the momentum of the bale carries it rearwardly beyond that delivery position. The shape and structure of the bale-engaging means is such as to enable release of the bale at that time.

The element arms 32 are rigidly cross connected in any appropriate manner, as by having a transverse tubular connector 36 at the pivot 30 and by having a transverse hollow connector 38 intermediate its ends. The side frames 20 are also suitably cross braced, as at 40, and are further braced fore-and-aft as at 42, all of which affords a rigid light weight construction. The framework of the supporting structure thus affords means for carrying a transverse crankshaft 44 which, together with other mechanism to be presently described, comprises power means for swinging the bale-moving element 32—32 on its delivery and return strokes. Drive is established in the first instance from the plunger-driving means of the baler, a typical flywheel of which is shown at 46 from which a chain and sprocket drive 48 is taken to a self-interrupting one-revolution clutch 50. Since this clutch may be conventional, and since it is further described in detail in the above-noted Morrison patent, it need not be elaborated here. Suffice it to say that it is typically controlled by a control member 52 which is tripped by suitable operating linkage 54 which is responsive to a bale-sensing finger 56. In short, the clutch is normally idle during the formation of the bale 16, but when the bale 16 is ejected a predetermined amount through the open rear end of the bale case extension 14, it engages the sensing finger 56 and rocks that finger counterclockwise, which motion is transmitted through the linkage 54 to the control member 52 which in turn thereupon energizes the clutch 50 for rotating the crankshaft 44 through one revolution. This motion is used to accomplish the delivery and return strokes of the bale moving arms 32.

The crankshaft 44 has rigidly secured thereto at its end opposite to the clutch 50 a crank arm 58, and this arm is connected to the bale-moving element 32—32 by a driving connection in the form of a pitman, indicated in its entirety by the numeral 60. Now, considering the pitman as a simple driving connection between the crank arm 58 and the bale-moving element, it will be seen that during substantially one-half revolution of the crankshaft 44, the bale-moving element is moved from its starting position (Fig. 2) to its delivery position (Fig. 3) and during its remaining portion of the revolution returns the bale-moving element to its starting position. Since the crankshaft is successively accelerative and decelerative in the first portion of its revolution and is successively accelerative and decelerative in the remaining portion of its revolution, it follows that these characteristics are transmitted through the pitman 60 to the bale-moving element. Accordingly, the bale-moving element accelerates from the position of Fig. 2 and decelerates at the position of Fig. 3, whereupon the bale, being released from the bale grippers 34, carries by its own momentum beyond the delivery position. Similar accelerative and decelerative characteristics occur during return of the bale-moving element to its starting position. It is at the ends, therefore, of the delivery and return strokes that the greatest loads occur, commonly referred to as peak loads. According to the present invention, principal concern is with the peak loading of the apparatus at the end of the delivery stroke of the bale-moving element. Part of the means for minimizing or absorbing the peak loading comprises snubbing means, here in the form of a shock absorber 62 of the hydraulic or fluid-flow-restrictive type. One end of the shock absorber is pivotally connected at 64 to an arm 66 rigid on the cross tube 36 of the bale-moving element, and the other end of the shock absorber is pivotally connected at 68 to a bracket 70 that is rigidly secured to and depends from the frame structure 20—20. The pivot point 68 is substantially directly below the element pivot 30 and a straight line drawn between these two points is to the right (Fig. 2) of the pivot point 64 between the arm 66 and the shock absorber 62. As the bale-moving element swings from the position of Fig. 2 to that of Fig. 3, the shock absorber 62 is first shortened as it crosses the straight line between the points 68 and 30, and thereafter lengthens as shown in Fig. 3. As pointed out in the Forth application noted above, the restriction in the shock absorber 62 is relatively minor during the transition from Fig. 2 to a point somewhat ahead of the position of Fig. 3, but the restriction increases substantially simultaneously with the attainment by the element 32—32 of its delivery position, whereby the end of the delivery stroke of the element is snubbed or retarded. Substantially the same characteristics occur on the return stroke of the mechanism.

Now, in order that the snubbing action will be primarily confined to the bale-moving element 32—32, it is desired to give this element a slight overrun as respects the power means or crankshaft 44. This is accomplished here by enabling the pitman 60 to extend. In other words, the pitman operates in compression on the power stroke of the crank arm 58, which stroke is substantially consonant with the delivery stroke of the element 32—32. The pitman operates in tension on the return strokes of the element and crankshaft arm. For this purpose, the pitman 60 is made up of a pair of relatively telescopic pitman parts 72 and 74, the former being received in the latter and a stop being provided at 76 to limit the amount of shortening of the pitman. The part 72 is pivotally connected at 78 to the free end of the crank arm 58 and the opposite end of the tubular part 74 is pivotally connected at 80 to the cross member 38 of the element 32—32. The part 74 has rigidly secured thereto, as by welding, a cross member or bar 82, and a similar bar 84 is rigidly connected by welding, for example, to the part 72. These bars 82 and 84 are spaced apart lengthwise of the pitman and serve as means for mounting a resilient device, here in the form of a pair of tension springs 86. Each spring is suitably anchored at 88 to the proximate end of the bar 82 and at its opposite end each spring is provided with a suitable internally threaded connector 90 into which an adjusting bolt 92 is threaded, the headed end of the bolt engaging behind the front bar 84. These bolts provide means whereby the tension on the springs may be adjusted.

In operation, the tension of the springs 86 serves to maintain the pitman 60 at its shortest length, the stop 76 on the part 72 engaging the proximate end of the tubular part 74. The stop 76 transmits force when the pitman is in compression, as when the crankshaft arm 58 on its power stroke is driving the bale-moving element on its delivery or throwing stroke. As the arm 58 reaches the end of its power stroke, which is substantially simultaneously with the attainment by the element of its delivery position, the springs 86 may yield and allow the element to have limited amount of overrun relative to the arm 58. It is at this time that the shock absorber has its maximum snubbing capacity, and the overrun enables the shock absorber to take over the job of snuffing the element 32—32, thus materially minimizing peak loads on the mechanism. During the return phase of the crank arm 58 and the corresponding return stroke of the element 32—32, the pitman returns to its original length in which the stop 76 engages the end of the tubular part 74 and at this time the element 32—32 is not loaded by a bale and the loading problems are not so pronounced.

It will be seen from the foregoing that a simple expedient has been provided to accomplish the objects previously outlined. The springs 86 constitute a yieldable device having the characteristics previously noted. Other mechanisms may be used in place of the springs. These and other alterations may be resorted to without departing from the spirit and scope of the invention.

What is claimed is:

1. Bale-handling apparatus, comprising: a support; power means on the support operative to successively accelerate and decelerate between the beginning and end of a power stroke; a bale-moving element carried by the support for movement on a delivery stroke from a starting position to a delivery position and having bale-engaging means operative at said starting position to engage a bale and releasable at said delivery position to enable the bale by its own momentum to carry beyond said delivery position; and a drive connection between the power means and the bale-moving element for incurring the delivery stroke of the element on the power stroke of the power means so that said element decelerates at its delivery position to release the bale as aforesaid, said drive connection incorporating a resilient device operative to yield at the end of the power stroke of the power means to enable the element to achieve limited overrun at said delivery position.

2. The invention defined in claim 1, including: snubbing means connected between the element and the support and operative to snub the element in its overrun.

3. The invention defined in claim 2, in which: the snubbing means is a shock-absorber of the fluid-flow-restriction type.

4. Bale-handling apparatus, comprising: a support; power means on the support operative to successively accelerate and decelerate between the beginning and end of a power stroke; a bale-moving element carried by the support for movement on a delivery stroke from a starting position to a delivery position and having bale-engaging means operative at said starting position to engage a bale and releasable at said delivery position to enable the bale by its own momentum to carry beyond delivery position; and a pitman interconnecting the power means and the bale-moving element for incurring the delivery stroke of the element on the power stroke of the power means so that said element decelerates at its delivery position to release the bale as aforesaid, said pitman including a pair of telescopically associated parts of fixed length in compression and extendible in tension and operative in compression on the power and delivery strokes of the power means and element, and spring means interconnecting said parts and resiliently resisting extension thereof, said spring means yielding at the end of the power stroke of the power means to enable the element to achieve limited overrun at said delivery position.

5. The invention defined in claim 4, in which: the pitman parts respectively have cross members secured thereto and having opposite ends at opposite sides of the pitman, and the spring means comprises a pair of tension springs, one at each side of the pitman and connected between the cross members.

6. The invention defined in claim 4, including: snubbing means connected between the element and the support and operative to snub the element in its overrun.

7. Bale-handling apparatus, comprising: a support; power means on the support including a crank arm operative through part of its revolution to successively accelerate and decelerate between the beginning and end of a power stroke and to successively accelerate and decelerate between the beginning and end of a return stroke to complete its revolution; a bale-moving element carried by the support for movement on a delivery stroke from a starting position to a delivery position and having bale-engaging means operative at said starting position to engage a bale and releasable at said delivery position to enable the bale by its own momentum to carry beyond said delivery position; and a pitman interconnecting the crank arm and the bale-moving element for incurring the delivery stroke of the element on the power stroke of the crank arm so that said element decelerates at its delivery position to release the bale as aforesaid and so that said element is returned to its starting position on the return stroke of the crank arm, said pitman including a pair of telescopically associated parts of fixed length in compression and extendible in tension and operative in compression on the power stroke of the crank arm and in tension on the return stroke of said crank arm, and spring means interconnecting said parts and resiliently resisting extension thereof, said spring means yielding at the end of the power stroke of the crank arm to enable the element to achieve limited overrun at said delivery position.

8. Bale-handling apparatus, comprising a support; a bale-moving element carried by the support for cyclic movement on a bale-propelling stroke from a starting position to a delivery position and on a return stroke back to said starting position; power means on the support and operative to successively accelerate and decelerate on a power stroke and to successively accelerate and decelerate on a return stroke; means connected between the support and the bale-moving element for snubbing said element at the ends of both of its strokes; and a drive connection between the power means and the bale-moving element for incurring the bale propelling stroke of the element on the power stroke of the power means and for incurring the return stroke of the bale-moving element on the return stroke of the power means, said drive connection incorporating a resilient device operative to yield at the end of the power stroke of the power means to enable the element to achieve limited overrun at its delivery position.

9. Apparatus for handling bales, comprising a support having an upper pivot; a bale-moving element supported by and depending from said upper pivot for cyclic swinging from a starting position to a delivery position and back to said starting position; power means on the support and operative to successively accelerate and decelerate in a delivery phase and to successively accelerate and decelerate in a return phase; bale-engaging means on a lower portion of the element operative to engage a bale at the starting position of said element to incur travel of the bale by said element toward said delivery position, said bale-engaging means being releasable from the bale at said delivery position so that the momentum of the bale carries it beyond said delivery position; a bracket on the support in spaced relation to the aforesaid upper pivot; snubbing means for retarding movement of the bale-moving element as it approaches each of its starting and delivery positions, said snubbing means including an over-center device connected to the bracket and connected to the element at a point in spaced relation to the upper pivot and adapted, as the element swings between its starting and delivery positions, to pass back and forth across a straight line drawn between the bracket and the point of connection of said device to the element, said device including resistance-effecting means operative to create resistances of major values as said device departs from said line; and a drive connection between the power means and the bale-moving element for swinging the element from its starting position to its delivery position in the delivery phase of said power means and to swing the element from its delivery position to its starting position in the return phase of said power means, said drive connection incorporating a resilient device operative to yield at the end of the delivery phase of the power means to enable the element to achieve limited overrun at said delivery position.

References Cited in the file of this patent

UNITED STATES PATENTS 1,443,854     Stewart _____ Jan. 20, 1923